(12) United States Patent
Althaus et al.

(10) Patent No.: US 7,270,488 B2
(45) Date of Patent: Sep. 18, 2007

(54) OPTOELECTRONIC TRANSMISSION AND/OR RECEPTION ARRANGEMENT

(75) Inventors: Hans-Ludwig Althaus, Lappersdorf (DE); Volker Plickert, Brieselang (DE); Lutz Melchior, Berlin (DE); Thomas Killer, Hohenschambach (DE)

(73) Assignee: Finisar Corporation, Sunnyvale, CA (US)

( * ) Notice: Subject to any disclaimer, the term of this patent is extended or adjusted under 35 U.S.C. 154(b) by 71 days.

(21) Appl. No.: 10/832,197

(22) Filed: Apr. 26, 2004

(65) Prior Publication Data
US 2004/0264883 A1   Dec. 30, 2004

(30) Foreign Application Priority Data
Jun. 27, 2003   (DE)   ............................ 103 29 988

(51) Int. Cl.
   *G02B 6/36*   (2006.01)
(52) U.S. Cl. ............................ 385/88; 385/92; 385/93; 385/139
(58) Field of Classification Search ................ 385/73, 385/74, 92, 93, 94, 139, 88, 89
   See application file for complete search history.

(56) References Cited

U.S. PATENT DOCUMENTS 4,420,219 A * 12/1983 Muchel ....................... 385/74
4,875,752 A    10/1989 Suzuki
5,459,805 A *  10/1995 Foster ......................... 385/74
6,491,443 B1 * 12/2002 Serizawa et al. ............. 385/61
6,869,232 B2 *  3/2005 Schunk et al. ................ 385/93
2004/0264883 A1* 12/2004 Althaus et al. ............... 385/88
2006/0088252 A1*  4/2006 Althaus et al. ............... 385/88

FOREIGN PATENT DOCUMENTS

DE    199 09 242 A1    8/2000
DE    199 61 624 A1    7/2001

* cited by examiner

*Primary Examiner*—Brian M. Healy
(74) *Attorney, Agent, or Firm*—Workman Nydegger

(57) ABSTRACT

The invention relates to an optoelectronic transmission and/or reception arrangement. The arrangement includes a transmission and/or reception module containing an optoelectronic transmission and/or reception component, and a plug interface for the coupling of an optical fiber thereto. An optical waveguide section is arranged in the plug interface, and at one of its ends is optically coupled to the transmission and/or reception component. At its other end, the optical waveguide section is configured to be coupled to an optical fiber. The arrangement may further include a lens for optical coupling of the light between the optical waveguide section and the transmission and/or reception component. The lens and the optical waveguide section, in one example, are formed as a prefabricated subassembly, in which the lens is fixedly arranged at a defined distance from one end face of the optical waveguide section.

24 Claims, 8 Drawing Sheets

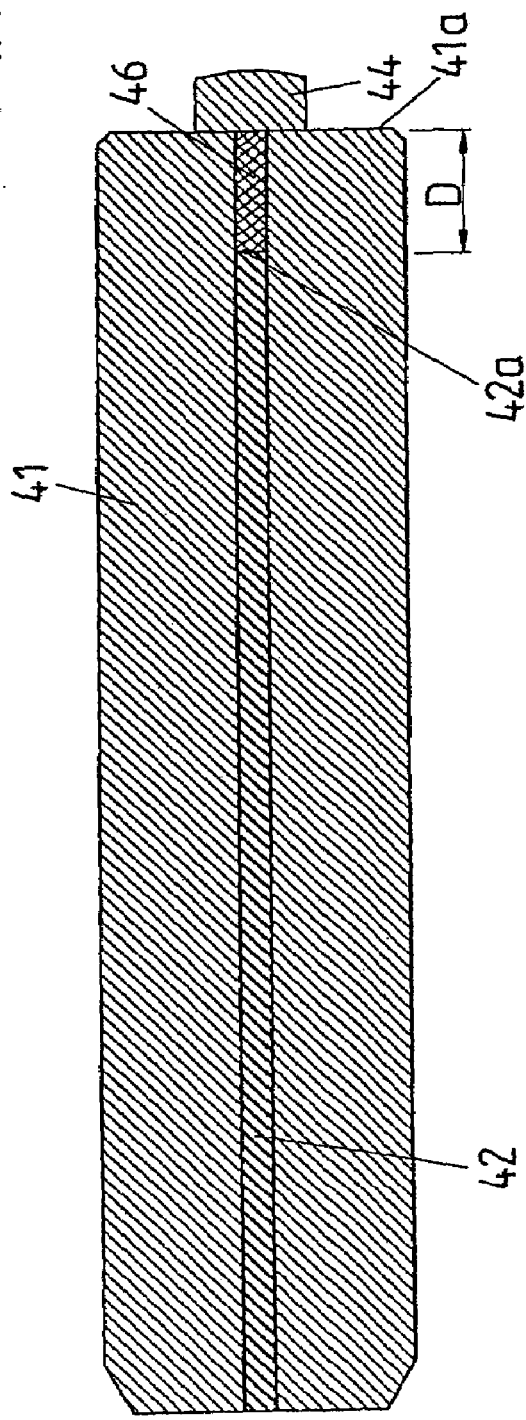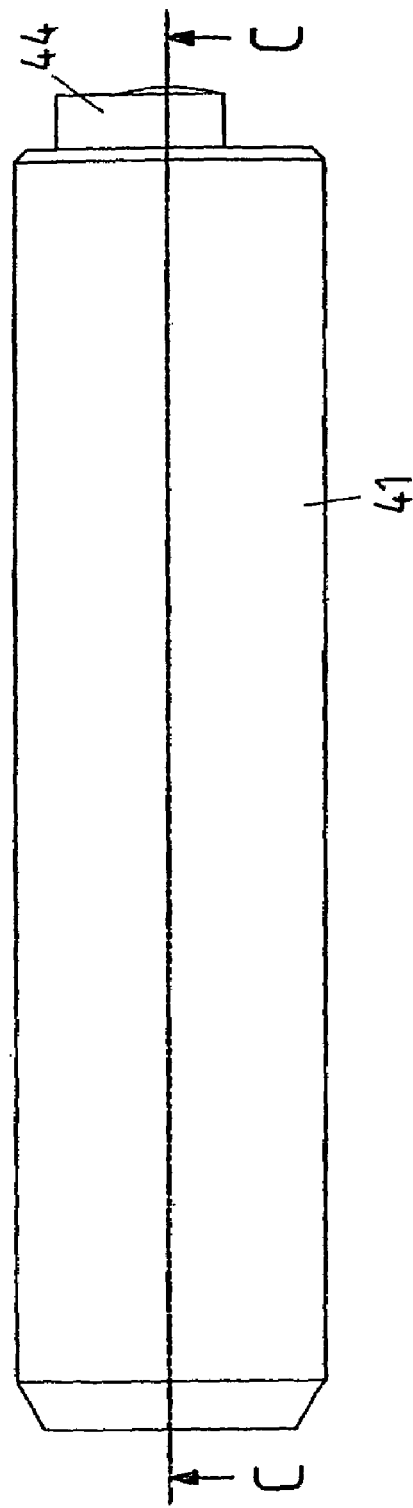

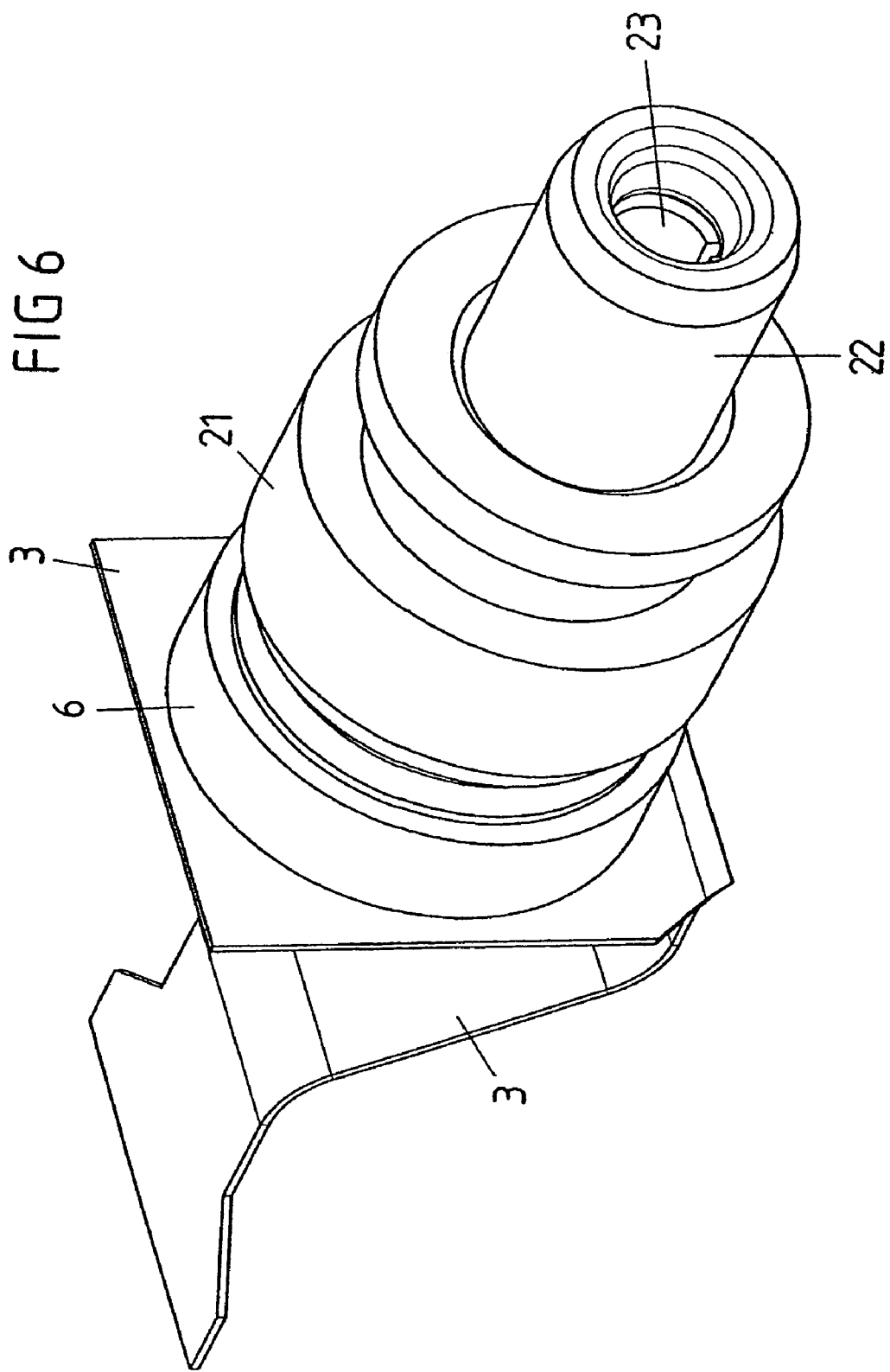

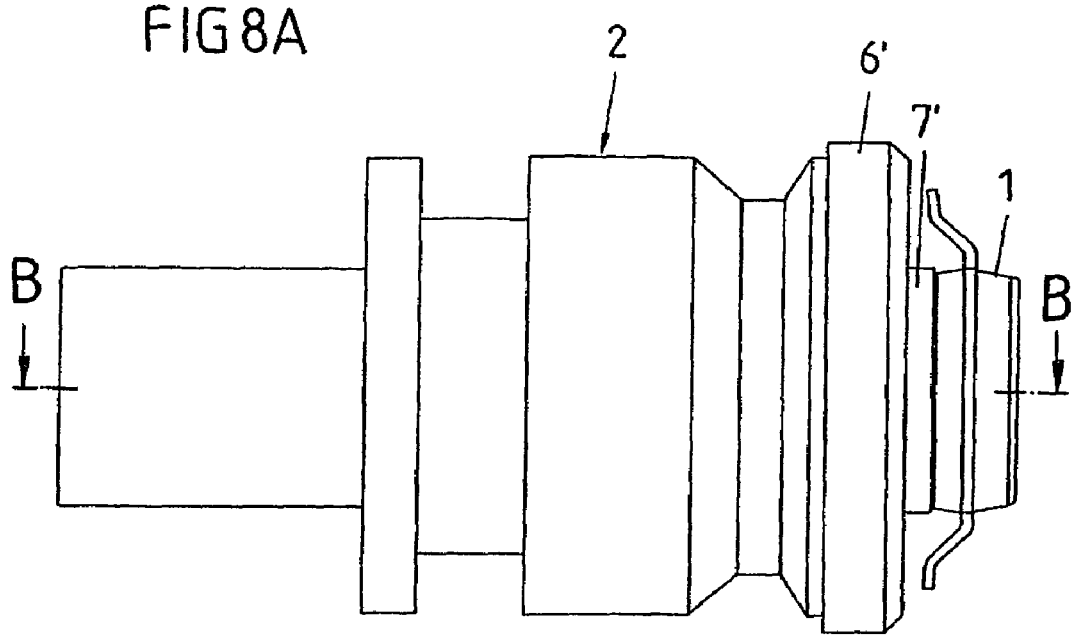
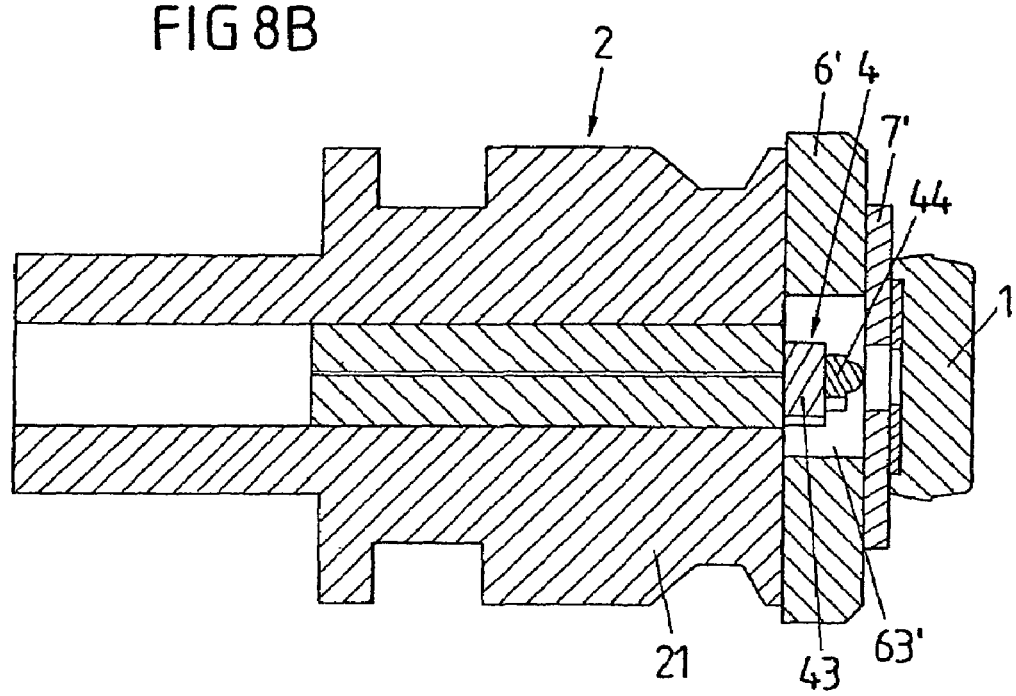

OPTOELECTRONIC TRANSMISSION AND/OR RECEPTION ARRANGEMENT

REFERENCE TO RELATED APPLICATIONS

This application claims the benefit of the priority date of German application DE 103 29 988.2 filed on Jun. 27, 2003, the contents of which are herein incorporated by reference in their entirety.

FIELD OF THE INVENTION

The invention relates to an optoelectronic transmission and/or reception arrangement having a transmission and/or reception module and a plug interface. It relates in particular to the optical coupling of an optoelectronic surface-mountable component to a standard plug interface.

BACKGROUND OF THE INVENTION

DE 199 09 242 A1 discloses an optoelectronic module in which a leadframe with an optoelectronic transducer is positioned in a module housing and potted with a light-transmissive, moldable material. Light is coupled in or out via an optical fiber coupled to a connector of the module housing. The driver module or reception module for the optoelectronic transducer is also situated on the leadframe.

DE 199 61 624 A1 describes a coupling arrangement for connecting an optical waveguide to an optoelectronic transmission or reception component arranged in a TO housing. For optical coupling between the optical waveguide and the optoelectronic component of the TO housing, a coupling lens is provided, which is arranged in a coupling housing or is formed in one piece in the latter.

Furthermore, coupling arrangements are known in which an optical waveguide section is integrated in a plug interface, said section serving as a coupling element and being optically coupled to an optoelectronic transmission and/or reception component, on the one hand, and to an optical fiber to be coupled, on the other hand. Such an optical waveguide section arranged in a plug interface is also referred to as a fiber stub.

In the course of reducing costs in the production of optoelectronic transmission and/or reception arrangements, it is increasingly of interest for the optoelectronic components to be arranged in a surface-mountable (SMD) housing, which is produced with a leadframe with electrical connections, using the housings and manufacturing methods that are customary in electronics.

There is thus a need for solutions which enable an optical waveguide to be optically coupled to a transmission and/or reception module arranged in a surface-mountable component. In this case, it is endeavoured to reduce the adjustment outlay by virtue of sufficiently precise mechanical definition of the distance between the optical fiber to be coupled and the transmission and/or reception component, so that it is not necessary to adjust said distance. Furthermore, feedbacks to the laser are to be avoided. Thus, feedbacks at optical interfaces arranged in the beam path lead to errors in the transfer behavior of the laser.

SUMMARY OF THE INVENTION

The following presents a simplified summary in order to provide a basic understanding of one or more aspects of the invention. This summary is not an extensive overview of the invention, and is neither intended to identify key or critical elements of the invention, nor to delineate the scope thereof. Rather, the primary purpose of the summary is to present some concepts of the invention in a simplified form as a prelude to the more detailed description that is presented later.

Accordingly, the present invention is based on the object of providing an optoelectronic transmission and/or reception arrangement having a transmission and/or reception module and a plug interface which enables an optical coupling between a transmission and/or reception module and an optical fiber to be coupled in a cost-effective manner, with few adjustment steps and in a manner that avoids feedback. Furthermore, the intention is that the optoelectronic transmission and/or reception arrangement provided can be used particularly for configurations in which the optoelectronic components are integrated into a surface-mountable component.

Accordingly, the solution according to the invention comprises an optical waveguide section arranged in a plug interface and a lens for optically imaging the light between the optical waveguide section and the transmission and/or reception component. The optical waveguide and lens are formed as a prefabricated subassembly or as part of a prefabricated subassembly, in which the lens is fixedly arranged at a defined distance from one end face of the optical waveguide section. The subassembly is prefabricated and fixed in the plug interface or realized by the latter in such a way as to provide a desired imaging between the transmission and/or reception component and the coupling end face of the optical waveguide section.

The invention thus provides for the definition of the image-side distance between the lens and the end face of the optical waveguide section, into or from which the light is coupled in or out, in a prefabricated subassembly. In this case, it may be provided that the subassembly is formed by the plug interface or the components thereof.

Precise adjustment of the lens with respect to the optical waveguide section in the subassembly during the production thereof obviates the requirement, in the case of the connection of the plug interface to the transmission and/or reception module, for still having to actively adjust the distance between the optical waveguide section and the transmission and/or reception component. Adjustment in the axial (Z) direction can thus also be dispensed with for a given imaging ratio.

An optical medium is situated between the end face of the optical waveguide section and the lens. In a preferred refinement of the invention, said optical medium is formed as a spacer having a defined thickness and a defined refractive index. The spacer constitutes part of the subassembly and is fixedly connected to the optical waveguide section and the lens. By way of example, the spacer comprises a glass block, but other materials may also be used. In principle, a spacer may also be dispensed with or it may be configured in such a way that only air or an immersion medium having a matched refractive index is then situated between the end face of the optical waveguide section and the lens.

In a preferred refinement of this variant of the invention, the optical waveguide section is situated in the hole in a ferrule. In this case, the spacer is placed directly onto the end face of the ferrule. For this purpose, the spacer is placed by means of a transparent adhesive, for example, onto the end face of the ferrule and the end face of the optical waveguide section arranged in the ferrule. In this case, the ferrule likewise constitutes part of the subassembly.

The ferrule and optical waveguide section form a so-called fiber stub.

This refinement has the advantage, inter alia, that it is possible to dispense with complicated polishing of that end face of the optical waveguide section which faces the transmission and/or reception module. It suffices, for example, to saw the end face. Thus, the transparent adhesive with which the spacer element is placed onto the end face of the fiber stub simultaneously acts as an immersion medium and eliminates the uneven and planar optical interfaces.

It is pointed out that, in the sense of the present invention, a ferrule is understood to be any small receiving tube and any structure which surrounds an optical waveguide or an optical waveguide section and provides mechanical stability.

In a further refinement of the invention, a spacer is not provided. Rather, the optical waveguide section is situated in a hole in a ferrule in such a way that one end side of the optical waveguide section stands back in the hole in the ferrule with respect to the corresponding end side of the ferrule, in other words thus ends before the end side of the ferrule. In this case, the lens is placed directly onto the end side of the ferrule, thus resulting overall in a defined distance between the lens and the end face of the optical waveguide section. In this case, the region of the hole in the ferrule between the end side of the optical waveguide section and the corresponding end side of the ferrule or the lens arranged there is preferably filled with an index-matched material, with the result that the refractive indexes are matched. The amount by which the fiber stands back with respect to the end face determines the imaging ratio.

In both refinements of the subassembly, the lens is adjusted very precisely relative to the optical waveguide section. In this case, the lens is preferably oriented and fixed relative to the light emerging from the optical waveguide section in such a way that radiation passes through the lens dome precisely at its center. A symmetrical coaxial imaging may then be present. This is not absolutely necessary, however, and can be freely chosen by way of the position of the lens.

The lens used is preferably formed as a planoconvex lens. In this case, the lens is preferably arranged in such a way that the convex area of the lens faces the transmission and/or reception module. The fact of the convex area of the lens (i.e. the lens dome) facing in the direction of the transmission and/or reception module has the advantage that the divergent light emitted from a transmission component is divergently reflected in intensified fashion. In this way, undesirable backreflections and thus feedbacks into the laser are greatly reduced without further measures. Therefore, a complicated oblique configuration of the end face of the optical waveguide section or the coupling-in of light from the laser at a squint angle, as is known in the prior art, is not necessary.

It may additionally be provided that that side of the lens which is remote from the transmission and/or reception module is coated with an antireflection layer. Backreflections are reduced further as a result of this.

The lens used may be produced from various materials and material combinations, in particular from glass, plastic, sapphire, silicon or silicon dioxide. The only proviso is that the required imaging ratio is provided between the optoelectronic transmission and/or reception component and the end face of the optical waveguide section of the plug interface.

In a further refinement of the invention, the plug interface forms a flange, in which the subassembly comprising optical waveguide section (with ferrule) and lens is arranged. In this case, the flange has a flange area which faces the transmission and/or reception module and via which a mechanical connection to the transmission and/or reception module can be effected. In this case, the lens dome of the lens projects by a defined amount with respect to the flange area, with the result that the precise distance between the lens dome and the transmission and/or reception module is unambiguously defined after the fixing of the transmission and/or reception module with the flange.

In a preferred refinement, a separate mounting interface, formed in particular as a mounting ring, is provided for the connection of the transmission and/or reception module to the flange of the plug interface. In this case, one side of the mounting ring is first connected to the transmission and/or reception module. The other side of the mounting ring can be connected to the flange. In this case, that side of the mounting ring which faces the flange has a planar area, with respect to which, during mounting, the flange can first of all be displaced and then fixed. In this way, an active adjustment in the X/Y direction is possible before the flange and the mounting ring or the plug interface and the transmission and/or reception module are fixed with respect to one another.

The mounting ring preferably has a central hole through which the light to be coupled passes. Furthermore, the mounting ring preferably has centering elements such as centering ribs, which enable the transmission and/or reception module to be pre-fixed with respect to the mounting ring and, in particular, prevent the transmission and/or reception module from slipping during mounting.

The optoelectronic transmission and/or reception arrangement according to the invention preferably has a module carrier, on which the transmission and/or reception module is mounted by surface mounting. In this case, light is coupled in and/or out through the module carrier. For this purpose, it is preferably provided that the module carrier has at least one opening and the transmission and/or reception module is arranged on one side of the module carrier in such a way that the optical path from and to the transmission and/or reception module runs through the opening to the other side (rear side) of the module carrier. In this case, the module carrier is connected to the plug interface on the rear side, for example by means of the mounting ring mentioned. However, a direct connection to the plug interface or a flange of the plug interface may also be effected.

The transmission and/or reception module is preferably formed as a surface-mountable component. The invention makes it possible to use an optoelectronic SMD component which is produced cost-effectively using customary production lines and does not have to have an integrated, optically imaging element. Through the use of a subassembly with an optical waveguide section and a coupling lens arranged at a defined distance with respect thereto, an optical coupling of such an SMD component to an optical waveguide to be coupled is nevertheless provided with high coupling efficiency and without the need for active adjustment in the Z direction.

The lens used may comprise a planar substrate, such as silicon, for example. For this case, mounting in the panel with subsequent singulation is possible, so that a particularly cost-effective solution is present. In this case, the plane rear side of the lens substrate, which does not have a light-shaping region, is fixed on a spacer or the end side of a ferrule. A connection between the lens and the spacer or the end side of the ferrule can correspondingly be produced in a simple manner, for instance by adhesive bonding.

In another variant, the lens is held in a planar substrate, for example, by positive locking or adhesive bonding. Monolithic integration of the lens into the planar substrate is not present in this variant.

It may furthermore be provided that the lens and the spacer comprise a common material, in particular are produced in one piece. In a development of this refinement, in the common material, a part of the region of the optical path is omitted and replaced by a different transparent optical medium. Said different optical medium has a selected refractive index in particular for light having wavelengths of between 1100 nm and 1600 nm. The optical path length in the spacer can be varied as a result of this.

The following description and annexed drawings set forth in detail certain illustrative aspects and implementations of the invention. These are indicative of but a few of the various ways in which the principles of the invention may be employed.

BRIEF DESCRIPTION OF THE DRAWINGS

The invention is explained in more detail below using a plurality of exemplary embodiments with reference to the figures, in which:

FIG. 4a shows a sectional view of an alternatively configured subassembly of an optoelectronic transmission and/or reception arrangement, the section being effected along the line C—C of FIG. 4b;

FIG. 4b shows a side view of the subassembly of FIG. 4a;

FIG. 6 shows a perspective view from the front of the arrangement of FIGS. 1 to 3;

FIG. 8a shows a third exemplary embodiment of an optoelectronic transmission and/or reception arrangement with a subassembly having an optical waveguide section and a lens, and FIG. 8b shows a sectional view of the arrangement of FIG. 8a along the line B—B.

DETAILED DESCRIPTION OF THE INVENTION

FIGS. 1 to 3, 5 and 6 show a first exemplary embodiment of an optoelectronic transmission and/or reception arrangement having a transmission and/or reception module 1 embodied as an SMD component and a plug interface 2 coupled to the transmission and/or reception module 1.

Figure 1:
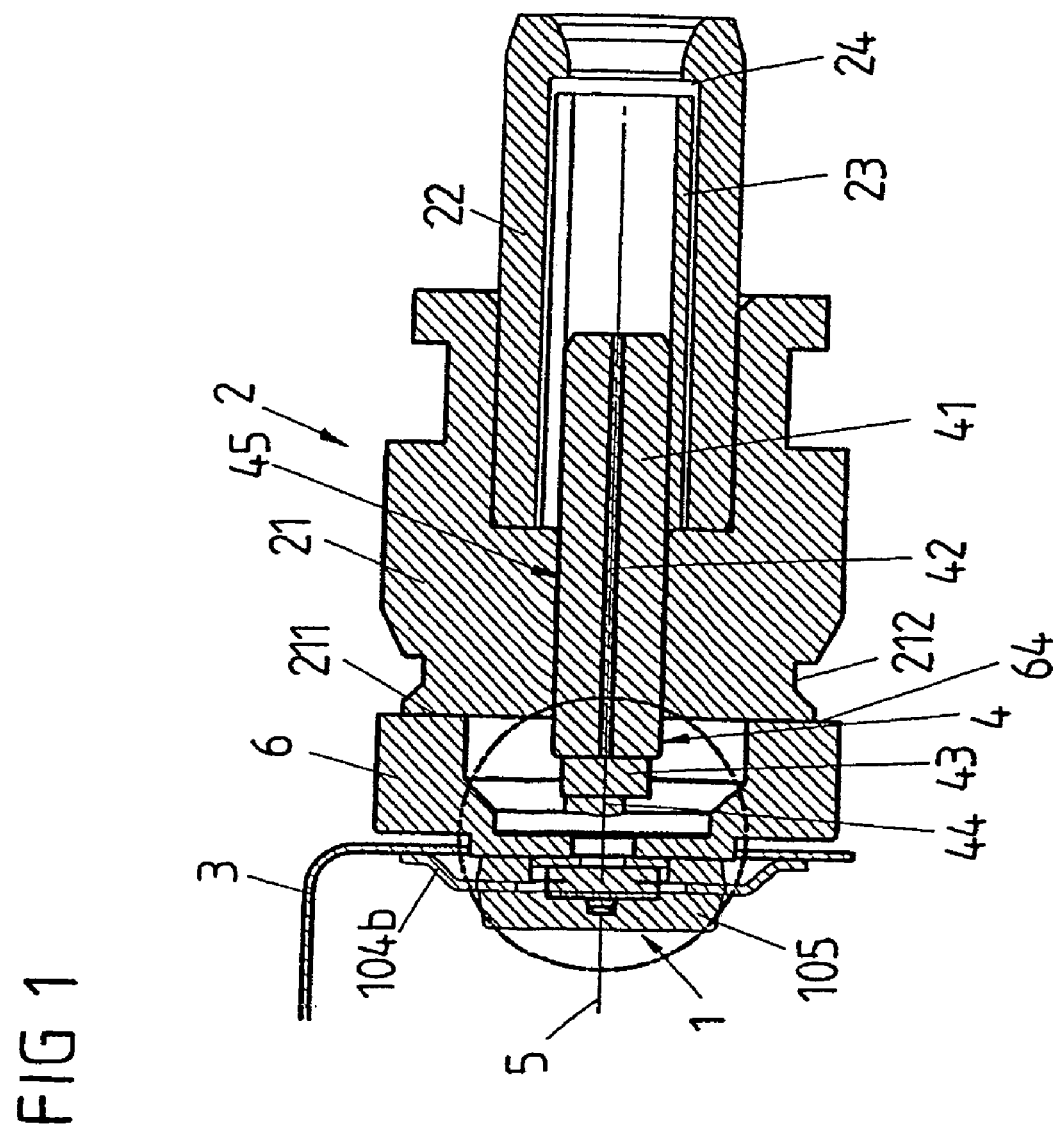
FIG. 1 shows a sectional view of a first exemplary embodiment of an optoelectronic transmission and/or reception arrangement with a subassembly having an optical waveguide section and a coupling lens, the section being effected along the line A—A of FIG. 3.

The SMD component 1 of FIG. 1 includes a vertically emitting laser 101, a monitor diode 102, a submount 103, a leadframe 104 and a plastic sheathing 105. In this case, the laser 101 is arranged with the active side downward (face-down mounting) on the submount 103, the submount being transparent to the transmission and/or reception wavelength. A gap that possibly exists between the laser 101 and the submount 103 is filled with an optically transparent medium in the optically active region.

The monitor diode 102 is arranged on the rear side of the laser 101 and detects a fraction of the radiation emitted by the laser diode 101 and serves for regulating the laser 101 in a manner known per se.

The submount 103 is fixed on a leadframe 104, which has a cut-out 104a centrally, said cut-out enabling light to be coupled in and/or out through the leadframe. The leadframe 104 serves, on the one hand, as a carrier for the submount 103 and, on the other hand, for supplying electrical contacts 104b formed as connecting legs on the edge side. Electrical contact is made with the laser 101 and the monitor diode 102 via bonding wires connected, on the one hand, to the electrical contacts 104b and, on the other hand, to bonding pads at the laser 101 and at the monitor diode 102 and at the surface of the submount 103.

The leadframe 104 together with the further components 101, 102, 103 are encapsulated by injection-molding with a molding composition that forms the plastic sheathing 105. In this case, the leadframe 104 and the plastic sheathing 105 terminate flush at the underside.

In order to make electrical contact with the module formed as an SMD component, a wiring carrier 3 is provided, which is, by way of example, a printed circuit board, in particular a flexible printed circuit board, the electrical conductive tracks of which are electrically conductively contact-connected to the connecting legs 104b of the leadframe 104.

In an alternative configuration (not illustrated), a reception diode is provided instead of a laser diode and detects light coupled out by an optical waveguide and converts it into electrical signals. In this case, the construction outlined remains fundamentally unchanged.

The plug interface 2 serves for arranging and receiving an optical waveguide into which light emitted by the laser 101 is coupled in and from which light is coupled out which is to be detected by a reception component of the optoelectronic SMD component 1. The plug interface, for example, includes a flange 21, a guide sleeve 22 and a prefabricated subassembly 4 comprising a glass or ceramic ferrule 41, an optical waveguide section 42, a spacer 43 and a coupling lens 44.

The glass or ceramic ferrule 41 has a central hole in a customary manner, the optical waveguide section 42 being fixed in said hole. In this case, the optical waveguide section 42 may subsequently be introduced into the hole in the ferrule 41 or be integrated directly into the ferrule during the production thereof, this last being expedient particularly in the case of ferrules made of glass. The ferrule 41 and the optical waveguide section 42 arranged therein are also referred to below as fiber stub 45.

The fiber stub 45 is mounted centrally and on the optical axis 5 of the laser 101 in the flange 21. The optical waveguide section is realized by a fiber, the two end faces of which terminate flush with the ferrule 41 in the exemplary embodiment illustrated, so that they form a common end face. The spacer element 43 is fixed on that side of the fiber stub 45 which faces the optoelectronic SMD component 1, the lens 44 being arranged, in turn, on said spacer element. The spacer element 43 comprises glass, for example, but may also comprise other materials, including gaseous media, that are optically transparent to wavelengths of, in particular, between 1 μm and 1.6 μm.

Figure 2:
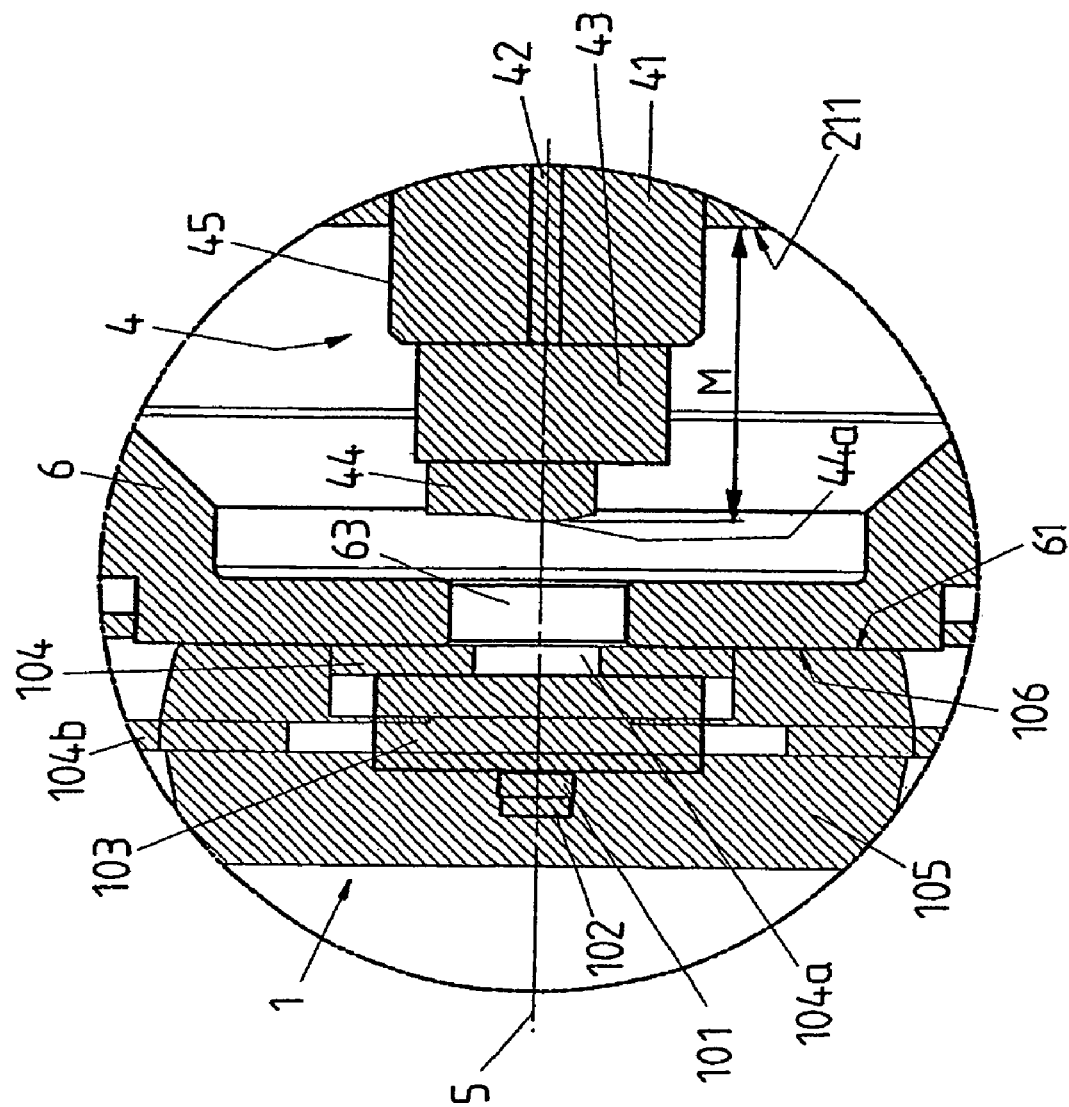
FIG. 2 shows a detail view of a portion of the sectional view of FIG. 1.
Figure 3:
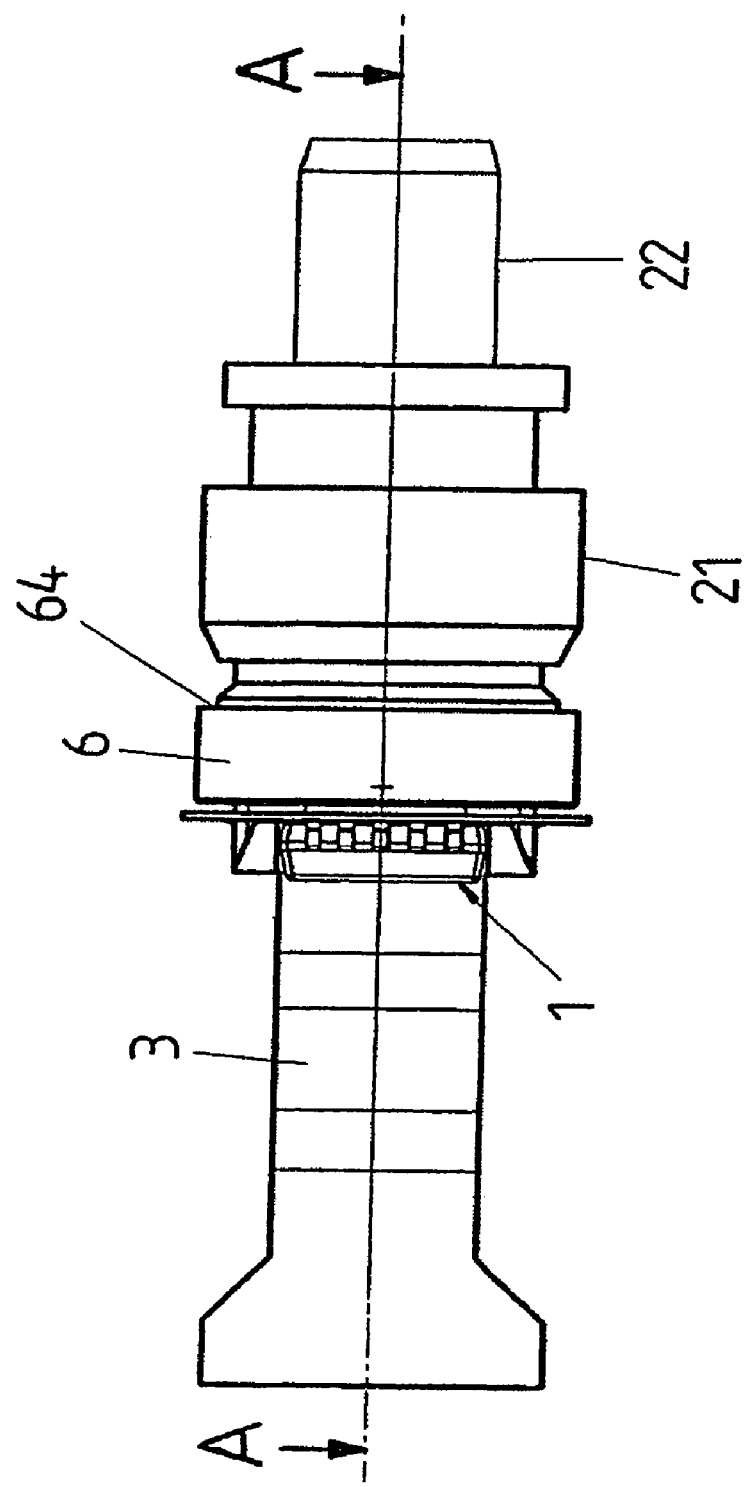
FIG. 3 shows a side view of the arrangement of FIG. 1, a flexible printed circuit board additionally being discernible.
Figure 5:
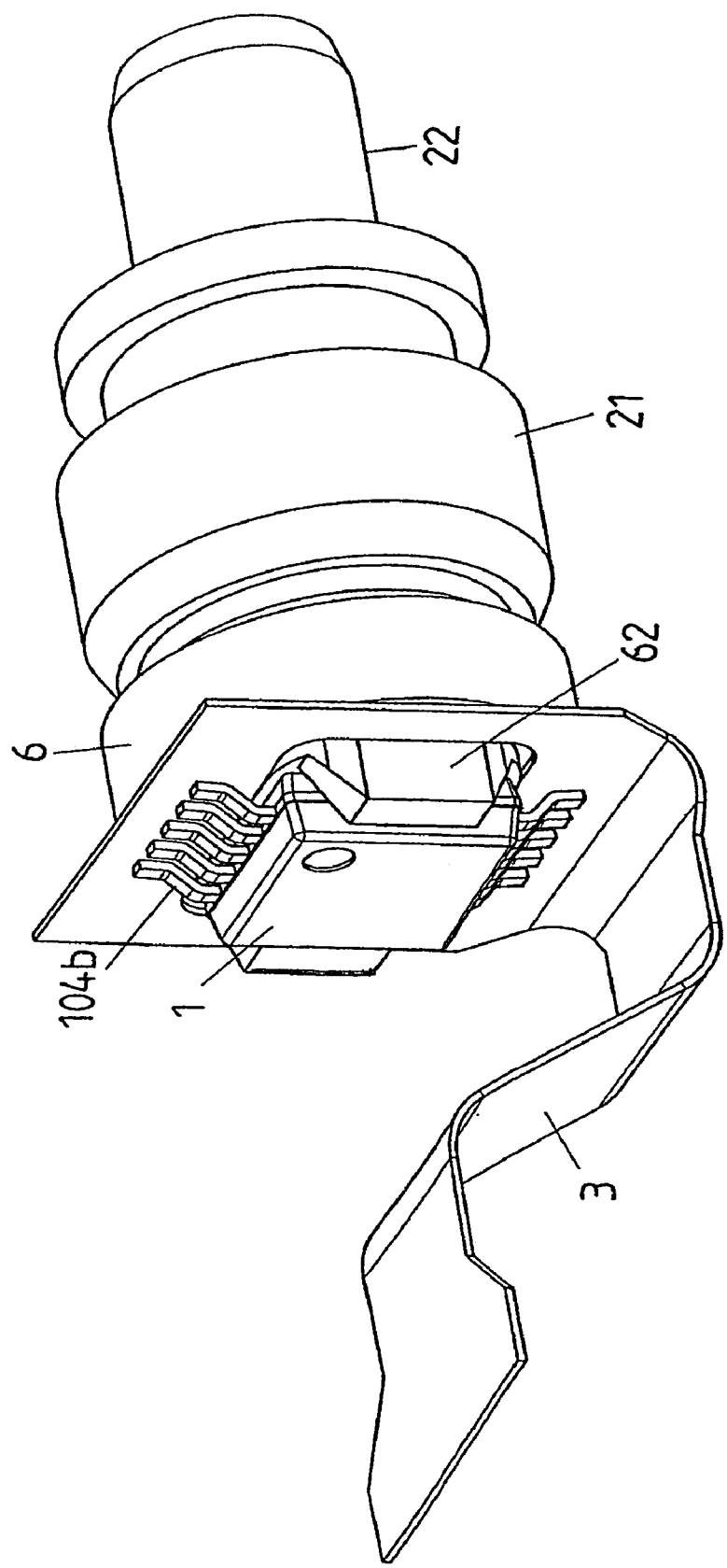
FIG. 5 shows a lateral perspective view of the arrangement of FIGS. 1 to 3.

The spacer element 43 fixedly sets a defined distance between the lens dome 44a of the lens 44 and the end face of the fiber stub 45 or the optical waveguide section 42. In this case, the fiber stub 45 is fixed in the flange 21 in such a way that the lens dome 44a projects by a defined amount M with respect to a flange area 211 formed by the flange 21 at its side facing the SMD component 1, as illustrated in FIG. 2. The distance M is defined by the thickness of the lens 44, the thickness of the spacer element 43 and the amount by which the ferrule 41 projects with respect to the flange area 211.

It is pointed out that the lens, in the exemplary embodiment illustrated, is advantageously formed in a planar substrate which, at its side facing the SMD component 1, forms the lens dome 44a, as beam-shaping element. Such a planar lens may be produced on a wafer and be obtained by subsequent singulation, thereby enabling cost-effective production. A lens produced in this way is also naturally planar at the underside, so that simple mounting on the spacer element 43 is possible. In principle, however, the lens may also be formed in a different way, for example as a glass lens which is fitted in a suitable mount on the spacer element 43 or is connected in some other way to the spacer element 43.

That end of the plug interface 2 or of the flange 21 which is remote from the SMD component 1 serves for receiving and coupling an optical plug. For this purpose, the guide sleeve 22 is pressed into the flange 21. A split sleeve 23 is in turn inserted in said guide sleeve, and is pushed onto the rear end of the fiber stub 45. The guide sleeve 22 centers an optical waveguide section of an optical plug that is to be contact-connected with respect to the fiber stub 45 pressed into the plug interface 2. In the course of the plugging operation, the split sleeve 23 may open by a certain amount, so that the optical waveguide section of the plug that is to be contact-connected is held securely in the sleeve 23. An undercut 24 at the guide sleeve 22 prevents the split sleeve 23 from inadvertently falling out of the guide sleeve 22.

It is pointed out that the illustrated configuration of the plug region of the plug interface 2 is to be understood only by way of example. Numerous other configurations are conceivable in respect of how an optical waveguide to be coupled can be optically connected to the rear end of the optical waveguide section 42 of the fiber stub 45. In this case, configurations of the plug interface are also conceivable in which the fiber stub 45 is led completely out of the plug interface and, at a distance from the plug interface, is coupled to a further optical waveguide or a suitable optical plug (so-called pigtail embodiment).

In order to connect the optoelectronic SMD component 1 to the plug interface 2, a mounting interface is provided in the exemplary embodiment illustrated, said mounting interface being formed by an essentially annular structure and being referred to as mounting ring 6 hereinafter.

The mounting ring 6 has a planar area 61 which faces the SMD component and is fixed at the underside of the SMD component 1. In this case, the underside 106 is formed by the underside of the leadframe 104 and the underside of the plastic housing 105 that is flush with respect thereto. As can be gathered from the illustration of FIG. 5, the mounting ring 6 may have two centering ribs 62 at the side facing the SMD component 1, which centering ribs serve for pre-fixing the SMD component 1 with respect to the mounting ring and prevent the SMD component 1 from slipping during mounting. Said centring ribs may also be completely omitted.

The mounting ring 6 furthermore has a central hole 63 which allows a passage of light. As can be gathered from FIG. 1, at its side facing the flange 1, the mounting ring 6 may have a stop area 64 formed in rotationally symmetrical and planar fashion, via which it is possible to bring about a connection to the flange area 211 of the flange 21. In particular, the contour of said flange area 211 is in this case matched to that of the mounting ring 6. In this case, in the course of active adjustment, the flange 22 is pressed onto the stop area 64 of the mounting ring and adjusted in the X-Y plane (perpendicular to the optical axis 5) in such a way that as much light as possible from the laser diode 101 is coupled into the core of the optical waveguide section 42 through the submount 103, the free-radiating region 63 in the mounting ring 6, through the lens 44 and the spacer element 43. The axial distance in the Z direction (coaxially with respect to the optical axis 5) between the laser diode 101 or the optical exit window of the SMD component 1, on the one hand, and the end face of the lens dome, on the other hand, is determined by a sum of readily controllable distances, namely the distance M between the end face of the lens dome and the stop area 211 of the flange 21, the thickness of the mounting ring 6 and the thickness of the leadframe 104, so that this axial distance can be precisely dimensioned down to a few micrometers. An adjustment in the Z direction can correspondingly be omitted.

In another configuration (not illustrated), however, it is also possible to realize this adjustment in the Z direction by virtue of the mounting ring 6 being correspondingly divided into two parts.

In order to compensate for an adjustment tolerance in the X, Y direction, the stop area 64 of the mounting ring 6 has a larger diameter than the flange area 211 of the flange 21. It is further pointed out that the flange area 211 is optimized for spot laser welding in the edge region by means of a peripheral contour 212.

The method for producing the transmission and/or reception arrangement is such that first of all the optoelectronic SMD component with the flexible printed circuit board 3 and the mounting interface 6 is prefabricated in the panel as an intrinsically testable assembly and provided for the coupling process with the plug interface 2. In this case, the thickness of the mounting ring 6 between the front and rear areas 61 and 64 can be precisely dimensioned down to a few micrometers. In the case of the plug interface 2, the subassembly comprising the fiber stub 45, the spacer 43 and the lens 44 is likewise prefabricated and then pressed into the corresponding hole in the flange 21 of the plug interface 2. The SMD component 1 and the plug interface 2 are subsequently connected to one another by means of the mounting ring 6. It is then possible to introduce an optical plug into the guide sleeve 22, whereby an optical coupling to the SMD component 1 or the optoelectronic component 101 thereof is produced by means of the optical waveguide section 42 and the further coupling elements.

In an alternative to this production method, the subassembly is constructed differently. In this case, the fiber stub 45 is first of all pressed into the hole in the flange 21 and the spacer 43 and the lens 44 are then mounted. In this variant, the flange is also part of the subassembly, so that the subassembly is formed by the elements of the plug interface 2.

FIGS. 4a and 4b illustrate an alternative configuration of the subassembly of the plug interface 2. The configuration of the transmission and/or reception arrangement is otherwise as described with reference to FIGS. 1 to 3, 5 and 6.

In accordance with the configuration of FIGS. 4a, 4b, the lens 44 is placed directly onto the end face 41a of the ferrule 41 without a spacer element being present. In order to provide, on the image side, a defined distance between the lens 41 and the optical waveguide section 42, which is again situated in the ferrule 41, the perpendicularly extending end face 42a of the optical waveguide section 42 stands back by a defined distance D with respect to the end face 41a of the ferrule 41. The resultant interspace 46 having the length D is filled with a medium having a defined refractive index. The subassembly produced in this way is adjusted in the manner described with reference to FIGS. 1 to 3. This configuration also yields a prefabricated assembly which can be tested prior to the coupling process with the SMD component 1.

Figure 7A:
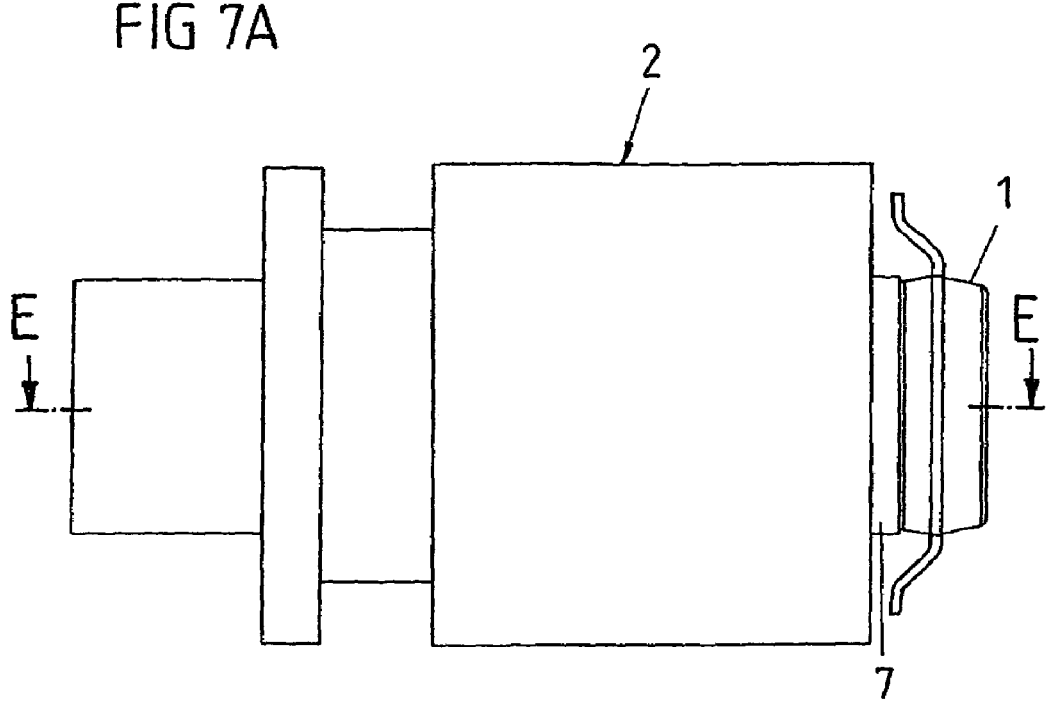
FIG. 7a shows a side view of a further exemplary embodiment of an optoelectronic transmission and/or reception arrangement with a subassembly having an optical waveguide section and a lens.
Figure 7B:
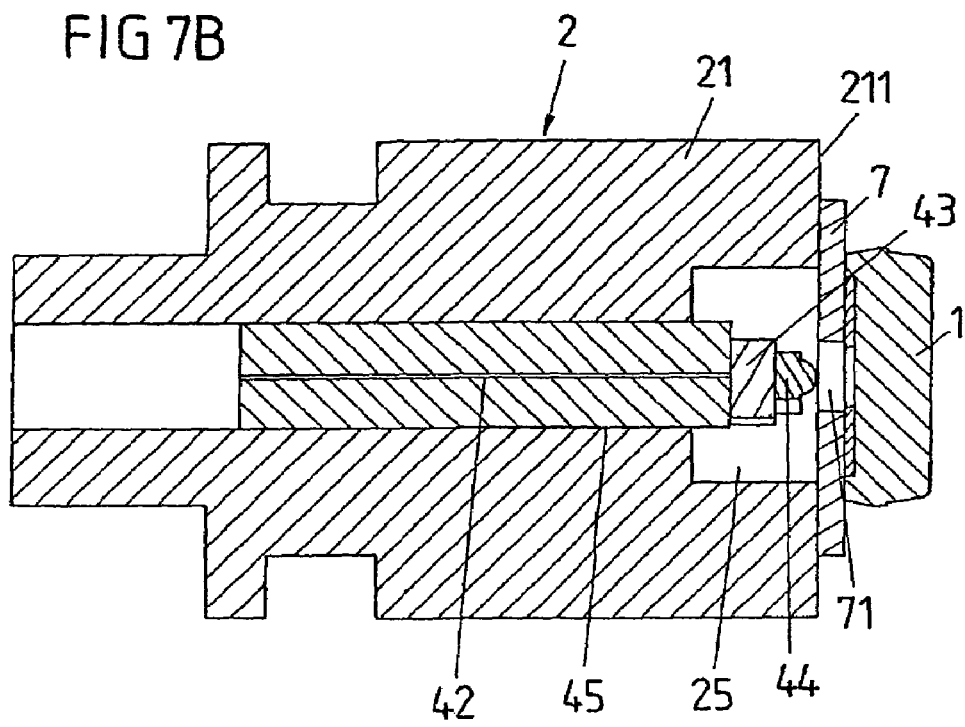
FIG. 7b shows a sectional view of the arrangement of FIG. 7a along the line E—E.

The exemplary embodiment of FIGS. 7a, 7b differs from the exemplary embodiment of the previous figures in so far as the mounting ring 6 of these figures is omitted. Instead, merely a mounting disk 7 with a central hole 71 is provided, on one side of which the SMD component 1 with the leadframe is fixed and the other side of which serves for connection to the flange area 211 of the flange 21 of the plug interface 2. The lens 44 is correspondingly arranged in a manner sunk in the flange 21, for which purpose the flange 21 has a cut-out 25 at its side facing the SMD component 1, into which cut-out project a part of the fiber stub 45, the spacer element 43 and indeed the lens 44. For the rest, there are no fundamental differences from the exemplary embodiment underlined previously.

The exemplary embodiment of FIGS. 8a, 8b again shows a configuration in which a mounting interface 6' is arranged between the plug interface 2 and the SMD component 1, the mounting interface 6' receiving the spacer element 43 and the lens 44 of the subassembly 4 in a central hole 63'. The mounting interface 6' serves for setting the optical distance between the SMD component 1 and the coupling lens 44 of the subassembly. On the other hand, it serves for mechanically connecting the component 1 to the plug interface 2 by means of methods known per se, such as welding, adhesive bonding or soldering. By means of an additional spacer disk 7', which concomitantly determines the optical distance between the lens 44 and the SMD component 1 or the transmission and/or reception component of the SMD component 1, it is possible to efficiently effect adaptation to different configurations of the plug interface and to automatic production processes for the connection of the SMD component to the plug interface.

The configuration of the invention is not restricted to the exemplary embodiments illustrated above. By way of example, it is also possible to use a transmission and/or reception module which is not embodied in an SMD design and, for example, is arranged in a TO housing. In a further alternative, it is provided that, when using an SMD component, the optical interface is formed on the top side and not, as in the exemplary embodiments illustrated, on the underside facing the leadframe. Furthermore, a wide variety of configurations of the plug interface may be provided. All that is essential to the invention is that a prefabricated subassembly is provided, in which the lens is fixedly arranged at a defined distance from the end face of an optical waveguide section.

Although the invention has been illustrated and described with respect to one or more implementations, alterations and/or modifications may be made to the illustrated examples without departing from the spirit and scope of the appended claims. In particular regard to the various functions performed by the above described components or structures (assemblies, devices, circuits, systems, etc.), the terms (including a reference to a "means") used to describe such components are intended to correspond, unless otherwise indicated, to any component or structure which performs the specified function of the described component (e.g., that is functionally equivalent), even though not structurally equivalent to the disclosed structure which performs the function in the herein illustrated exemplary implementations of the invention. In addition, while a particular feature of the invention may have been disclosed with respect to only one of several implementations, such feature may be combined with one or more other features of the other implementations as may be desired and advantageous for any given or particular application. Furthermore, to the extent that the terms "including", "includes", "having", "has", "with", or variants thereof are used in either the detailed description and the claims, such terms are intended to be inclusive in a manner similar to the term "comprising".

The invention claimed is:

1. An optoelectronic transmission or reception arrangement, comprising:
    a transmission or reception module comprising an optoelectronic transmission or reception component;
    a plug interface adapted to optically couple an optical fiber to the optoelectronic transmission or reception component;
    an optical waveguide section arranged in the plug interface, and optically coupled, at one of its ends, to the transmission or reception component and, at its other end, configured to optically couple to the optical fiber when coupled thereto; and
    a lens adapted to optically couple light between the optical waveguide section and the transmission or reception component,
    wherein the lens and the optical waveguide section are formed as a prefabricated subassembly in which the lens is fixedly arranged at a defined distance from one end face of the optical waveguide section.

2. The arrangement of claim 1, further comprising a spacer having a defined thickness and a defined refractive index, the spacer arranged as part of the subassembly between and fixedly connected to one end face of the optical waveguide section and the lens.

3. The arrangement of claim 2, wherein the spacer comprises a glass block.

4. The arrangement of claim 2, further comprising a ferrule forming a portion of the subassembly, wherein the optical waveguide section is arranged in a hole in the ferrule, wherein the spacer is placed directly onto one end face of the ferrule.

5. The arrangement of claim 1, further comprising a ferrule forming a portion of the subassembly, wherein the optical waveguide section is arranged in a hole in the ferrule, wherein one end side of the optical waveguide section is offset in the hole with respect to a corresponding end side of the ferrule, and wherein the lens is placed directly onto the corresponding end side of the ferrule.

6. The arrangement of claim 5, wherein a region in the hole in the ferrule defined by the offset between the end side of the optical waveguide section and the corresponding end side of the ferrule or the lens arranged there is filled with an index-matched material.

7. The arrangement of claim 1, wherein the lens comprises a planoconvex lens.

8. The arrangement of claim 7, wherein the lens is arranged such that a convex area of the lens faces the transmission or reception module.

9. The arrangement of claim 7, wherein that side of the lens that is remote from the transmission or reception module is coated with an antireflection layer.

10. The arrangement of claim 1, wherein the lens is mounted to the optical waveguide section such that light radiates through it precisely centrically.

11. The arrangement of claim 1, wherein the lens comprises glass, plastic, sapphire, silicon, silicon dioxide or an optical material having transparency to wavelengths of between about 1100 nm and 1600 nm.

12. The arrangement of claim 1, wherein the ping interface further comprises a flange, wherein the subassembly with the optical waveguide section and the lens is arranged in the flange of the plug interface, and wherein the flange has a flange area facing the transmission or reception module.

13. The arrangement of claim 12, wherein the lens comprises a lens dome, and wherein the lens dome projects a defined amount with respect to the flange area toward the transmission or reception module.

14. The arrangement of claim 12, further comprising a mounting ring having one side connected to the transmission or reception module and another side connected to the flange, where the side of the mounting ring that faces the flange comprises a planar area, with respect to which, during mounting, the flange is displaceable for axial alignment of the transmission or reception module and the flange.

15. The arrangement of claim 14, wherein the mounting ring comprises a structure defining a central hole associated therewith.

16. The arrangement of claim 14, wherein the mounting ring comprises centering elements which serve to fix the transmission or reception module.

17. The arrangement of claim 1, further comprising a module carrier on which the transmission or reception module is surface-mounted, and configured to couple light therethrough.

18. The arrangement of claim 17, wherein the module carrier comprises at least one opening, and the transmission or reception module is arranged on one side of the module carrier such that the optical path from and to the transmission or reception module runs through the opening to a rear side of the module carrier, the module carrier being connected to the plug interface on the rear side thereof.

19. The arrangement of claim 1, wherein the transmission or reception module is configured as a surface-mount component constructed with a module carrier farmed as a leadframe.

20. The arrangement of claim 1, wherein the lens is farmed in a planar substrate.

21. The arrangement of claim 1, wherein the lens is held in a planar substrate.

22. The arrangement of claim 1, wherein the lens and the spacer comprise a common material.

23. The arrangement of claim 22, wherein a gap resides within the common material in a portion of the optical path, and wherein the gap is filled with a different material, the different material comprising a transparent optical medium having a selected refractive index for light having wavelengths of between about 1100 nm and 1600 nm.

24. The arrangement of claim 1, wherein the subassembly is formed by the components of the plug interface.

* * * * *

UNITED STATES PATENT AND TRADEMARK OFFICE
CERTIFICATE OF CORRECTION

| | |
|---|---|
| PATENT NO. | : 7,270,488 B2 |
| APPLICATION NO. | : 10/832197 |
| DATED | : September 18, 2007 |
| INVENTOR(S) | : Althaus et al. |

It is certified that error appears in the above-identified patent and that said Letters Patent is hereby corrected as shown below:

Column 10
Line 51, change "flirther" to --further--

Column 12
Line 14, change "farmed" to --formed--
Line 17, change "farmed" to --formed--

Signed and Sealed this

Fourteenth Day of September, 2010

David J. Kappos
*Director of the United States Patent and Trademark Office*